United States Patent
Cao

(10) Patent No.: US 12,517,409 B2
(45) Date of Patent: Jan. 6, 2026

(54) ELECTROCHROMIC DEVICE AND ELECTRONIC TERMINAL

(71) Applicant: GUANGYI INTELLIGENT TECH (SUZHOU) CO., LTD., Jiangsu (CN)

(72) Inventor: Chaoyue Cao, Jiangsu (CN)

(73) Assignee: GUANGYI INTELLIGENT TECH (SUZHOU) CO., LTD., Jiangsu (CN)

( * ) Notice: Subject to any disclaimer, the term of this patent is extended or adjusted under 35 U.S.C. 154(b) by 339 days.

(21) Appl. No.: 18/231,154

(22) Filed: Aug. 7, 2023

(65) Prior Publication Data

US 2023/0384644 A1    Nov. 30, 2023

Related U.S. Application Data

(63) Continuation of application No. PCT/CN2022/073609, filed on Jan. 25, 2022.

(30) Foreign Application Priority Data

Feb. 6, 2021 (CN) .......................... 202110164716.5

(51) Int. Cl.
 *G02F 1/155*  (2006.01)
 *G02F 1/1523*  (2019.01)

(52) U.S. Cl.
 CPC ............ *G02F 1/155* (2013.01); *G02F 1/1525* (2013.01)

(58) Field of Classification Search
 CPC ...................................................... G02F 1/155
 See application file for complete search history.

(56) References Cited

U.S. PATENT DOCUMENTS 6,559,419 B1    5/2003  Sol
2011/0260961 A1   10/2011 Burdis
(Continued)

FOREIGN PATENT DOCUMENTS

CN        102460292 A    5/2012
CN        107045243 A    8/2017
(Continued)

OTHER PUBLICATIONS

Chinese Office Action for corresponding application 202110164716.5; Report dated Jul. 26, 2022.
(Continued)

*Primary Examiner* — Edmond C Lau
(74) *Attorney, Agent, or Firm* — CANTOR COLBURN LLP

(57) ABSTRACT

Provided are an electrochromic device and an electronic terminal. The electrochromic device includes a lead-out electrode and a first base layer, a first conductive layer, an electrochromic layer, a second conductive layer and a second base layer which are stacked in sequence. The first conductive layer has at least one first region and at least one second region. The first region is electrically connected to the lead-out electrode. A first groove is disposed between the first region and the second region and extends through the first conductive layer in a vertical direction. A conductive channel is further disposed between the first region and the second region, and the first groove is broken at the conductive channel. The second region is electrically connected to the first region and the lead-out electrode through the conductive channel.

20 Claims, 5 Drawing Sheets

(56) References Cited

U.S. PATENT DOCUMENTS

| | | | |
|---|---|---|---|
| 2012/0147449 A1* | 6/2012 | Bhatnagar | B32B 17/10055 |
| | | | 359/275 |
| 2013/0222878 A1 | 8/2013 | Greer | |
| 2014/0177028 A1* | 6/2014 | Shrivastava | G02F 1/1533 |
| | | | 359/275 |
| 2019/0004386 A1 | 1/2019 | Bergh | |
| 2020/0272015 A1* | 8/2020 | Wang | E06B 3/6722 |

FOREIGN PATENT DOCUMENTS

| | | |
|---|---|---|
| CN | 108037629 A | 5/2018 |
| CN | 110337716 A | 10/2019 |
| CN | 112230486 A | 1/2021 |
| CN | 112904636 A | 6/2021 |

OTHER PUBLICATIONS

International Search Report for corresponding application PCT/CN2022/073609 filed Jan. 25, 2022, Mail date Apr. 28, 2022.

\* cited by examiner

ELECTROCHROMIC DEVICE AND ELECTRONIC TERMINAL

CROSS-REFERENCE TO RELATED APPLICATION

This application is a Continuation of International Patent Application No. PCT/CN2022/073609, filed on Jan. 25, 2022, which is based on and claims priority to Chinese Patent Application No. 202110164716.5 filed with the China National Intellectual Property Administration (CNIPA) on Feb. 6, 2021, the disclosures of which are incorporated herein by reference in their entireties.

TECHNICAL FIELD

The present application relates to the field of electrochromic technology, for example, an electrochromic device and an electronic terminal.

BACKGROUND

Electrochromism refers to a phenomenon of a stable and reversible color change of optical properties of a material under the action of an applied electric field and shows a reversible change in color and transparency in appearance. A material with electrochromic performance is referred to as an electrochromic material, which may include an inorganic electrochromic material and an organic electrochromic material. The inorganic electrochromic material has the advantages of stability and quick response, such as tungsten trioxide, vanadium(V) oxide, nickel oxide and titanium dioxide. The organic electrochromic material, such as viologens and polythiophenes, has various types and rich colors, and is convenient to design.

A device made of the electrochromic material is referred to as an electrochromic device. Different electrochromic materials are selected so that electrochromic devices with different colors and different color-changing ranges can be obtained. The electrochromic device has very important application prospects in the fields of color-changing glasses, electronic display, military concealment, building energy conservation and so on.

A common electrochromic device generally consists of a transparent substrate layer, a transparent conductive layer, an electrochromic layer, an electrolyte layer, an ion storage layer, a transparent conductive layer and a transparent substrate layer which are stacked in sequence. After a voltage is applied, ions are conducted from the ion storage layer via the electrolyte layer into the electrochromic layer to achieve color changing; and after a reverse voltage is applied, ions are conducted from the electrochromic layer via the electrolyte layer into the ion storage layer to achieve fading.

In some application scenarios, it is desirable that the electrochromic device does not achieve uniform color changing as a whole, but rather to be able to present a pattern in a color change process to achieve an effect of displaying information or enhancing a sense of appearance design.

A processing method generally adopted in the related art is to etch one of the transparent conductive layers so as to completely separate the conductive layers in different regions, separately lead out from the conductive layers in the different regions and control the color changing of multiple regions through multiple lead-out electrodes, respectively. However, this processing method will increase the number of lead-out electrodes of the device, thereby making a structure of the device more complex, increasing a process difficulty and increasing a cost.

SUMMARY

The present application provides an electrochromic device and an electronic terminal. The electrochromic device provided in the present application is capable of presenting a pattern in a color change process without increasing the number of lead-out electrodes.

The present application adopts the solutions below.

In a first aspect, the present application provides an electrochromic device. The electrochromic device includes a lead-out electrode and a first base layer, a first conductive layer, an electrochromic layer, a second conductive layer and a second base layer which are stacked in sequence.

The first conductive layer has at least one first region and at least one second region.

The first region is electrically connected to the lead-out electrode.

A first groove is disposed between the first region and the second region and extends through the first conductive layer in a vertical direction.

A conductive channel is further disposed between the first region and the second region, and the first groove is broken at the conductive channel.

The second region is electrically connected to the first region and the lead-out electrode through the conductive channel.

In a second aspect, the present application provides an electronic terminal. The electronic terminal includes the electrochromic device according to the first aspect.

Figure 1:
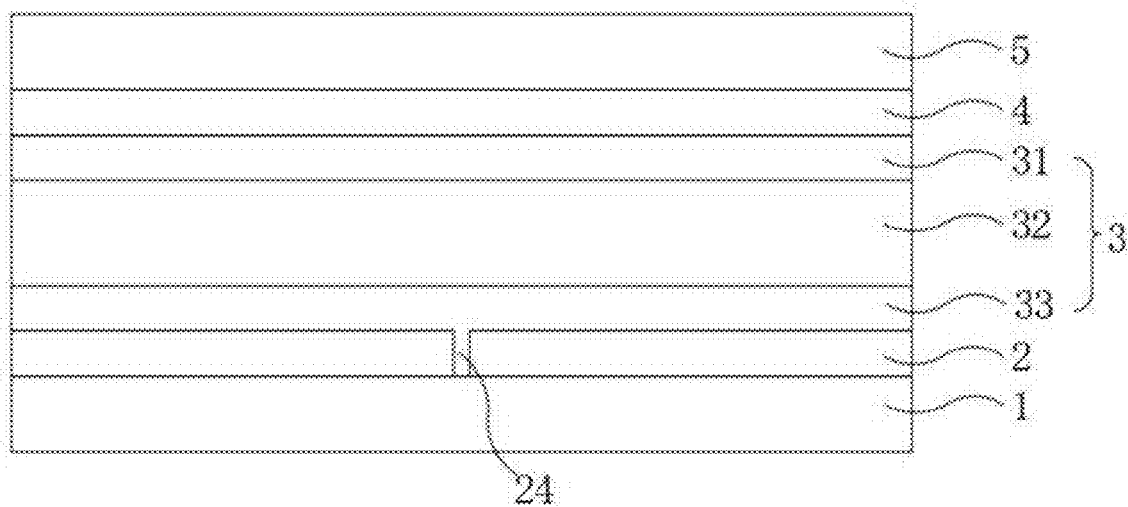
FIG. 1 is a sectional view of an electrochromic device according to embodiment one of the present application.

REFERENCE LIST 1 first base layer
2 first conductive layer
3 electrochromic layer
4 second conductive layer 5 second base layer
6 lead-out electrode
21 first region
22 second region
23 conductive channel
24 first groove
25 second groove
26 third groove
27 busbar
271 first busbar main portion
272 first busbar connection portion
273 second busbar main portion
274 second busbar connection portion
31 color-changing material layer
32 solid electrolyte layer
33 ion storage layer
211 first portion of the first region
212 second portion of the first region
2721 first endpoint of the first busbar connection portion
2722 second endpoint of the first busbar connection portion
2741 first endpoint of the second busbar connection portion
2742 second endpoint of the second busbar connection portion

DETAILED DESCRIPTION

In the description of the present application, it is to be understood that orientational or positional relationships indicated by terms "center", "longitudinal", "transverse", "above", "below", "front", "back", "left", "right", "vertical", "horizontal", "top", "bottom", "inside", "outside" and the like are based on the orientational or positional relationships illustrated in the drawings, which are merely for facilitating and simplifying the description of the present application. These relationships do not indicate or imply that an apparatus or component referred to has a specific orientation and is constructed and operated in a specific orientation, and thus it is not to be construed as limiting the present application. Additionally, terms such as "first" and "second" are merely for description and are not to be construed as indicating or implying relative importance or implicitly indicating the number of technical features as indicated. Thus, a feature defined as a "first" feature or a "second" feature may explicitly or implicitly include one or more of such features. In the description of the present application, unless otherwise noted, the term "multiple" means two or more.

In the description of the present application, it is to be noted that unless otherwise expressly specified and limited, the term "disposed", "connected to each other" or "connected" should be construed in a broad sense as fixedly connected, detachably connected or integrally connected; mechanically connected or electrically connected; directly connected to each other or indirectly connected to each other via an intermediary; or connected internally between two components. For those of ordinary skill in the art, specific meanings of the preceding terms in the present application may be construed according to specific circumstances.

Embodiment One

The present embodiment provides an electrochromic device with a structure shown in FIG. 1, including a first base layer 1, a first conductive layer 2, an electrochromic layer 3, a second conductive layer 4 and a second base layer 5 which are stacked in sequence.

The electrochromic layer 3 includes a color-changing material layer 31, a solid electrolyte layer 32 and an ion storage layer 33 which are stacked in sequence.

A first groove 24 is disposed on the first conductive layer 2 and extends through the first conductive layer 2 in a vertical direction.

Figure 2:
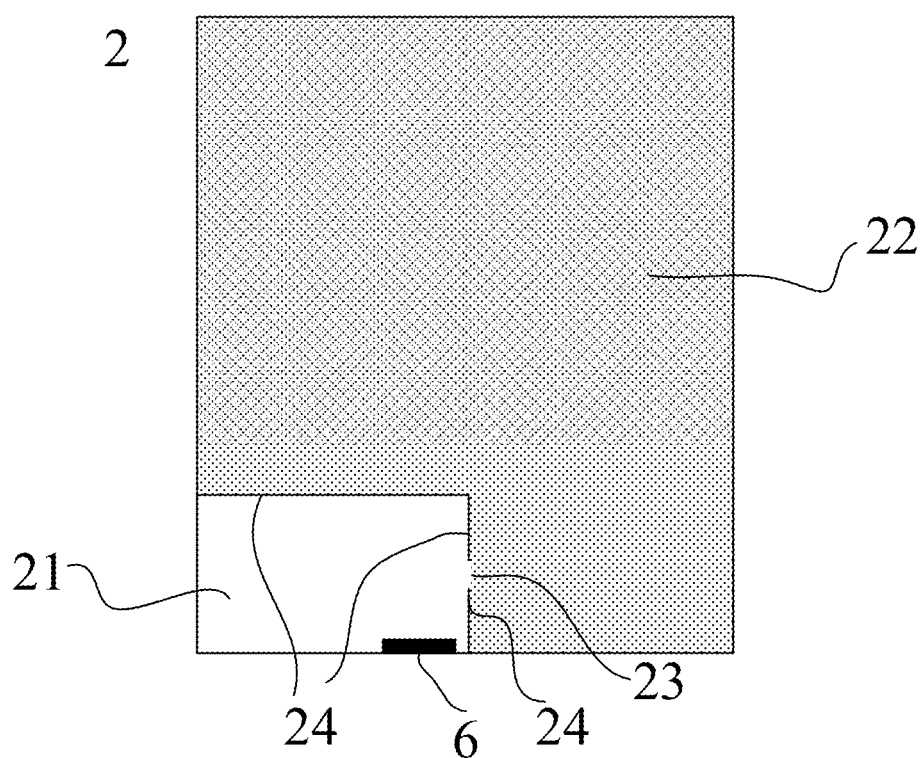
FIG. 2 is a structure diagram of a first transparent conductive layer of an electrochromic device according to embodiment one of the present application.

In FIG. 2, all thin solid lines inside an outer edge represent the first groove 24.

As shown in FIG. 2, the first conductive layer 2 has one first region 21 and one second region 22.

The first region 21 is electrically connected to a lead-out electrode 6.

The first groove 24 is disposed between the first region 21 and the second region 22, and the first groove 24 is a slot extending through the first conductive layer 2 in the vertical direction through laser etching.

A conductive channel 23 is further disposed between the first region 21 and the second region 22, and the first groove 24 is broken at the conductive channel 23.

The second region 22 is electrically connected to the first region 21 and the lead-out electrode 6 through the conductive channel 23.

A width of the conductive channel 23 is 0.05% of a perimeter of the second region 22.

In the present embodiment, the first groove 24 is formed before the ion storage layer 33 is coated, so as to easily ensure the integrity of the structure of the device.

In the present embodiment, through the setting of the width of the conductive channel 23 to 0.05% of the perimeter of the second region 22, a length of a shortest conduction path between a point in an interior of the second region 22 and the lead-out electrode is increased, a minimum conduction line resistance is increased, and a color change speed is slowed down, so that a color change speed of the second region 22 is less than a color change speed of the first region 21, thereby displaying a pattern with a specific rule in a color change process. Moreover, only one lead-out electrode 6 is needed to lead to the first conductive layer 2, which has the advantages of simple structure and process and low cost.

It is to be understood that the second conductive layer 4 is electrically connected to another lead-out electrode (not shown in Figure). The two lead-out electrodes 6 are connected to an external power supply and a control circuit, thereby achieving the color-changing control of the electrochromic device. The disposition of another lead-out electrode is a technique well-known to those skilled in the art, which does not need to be described in detail in the embodiment here and the following embodiments of the present application.

Embodiment Two

Figure 3:
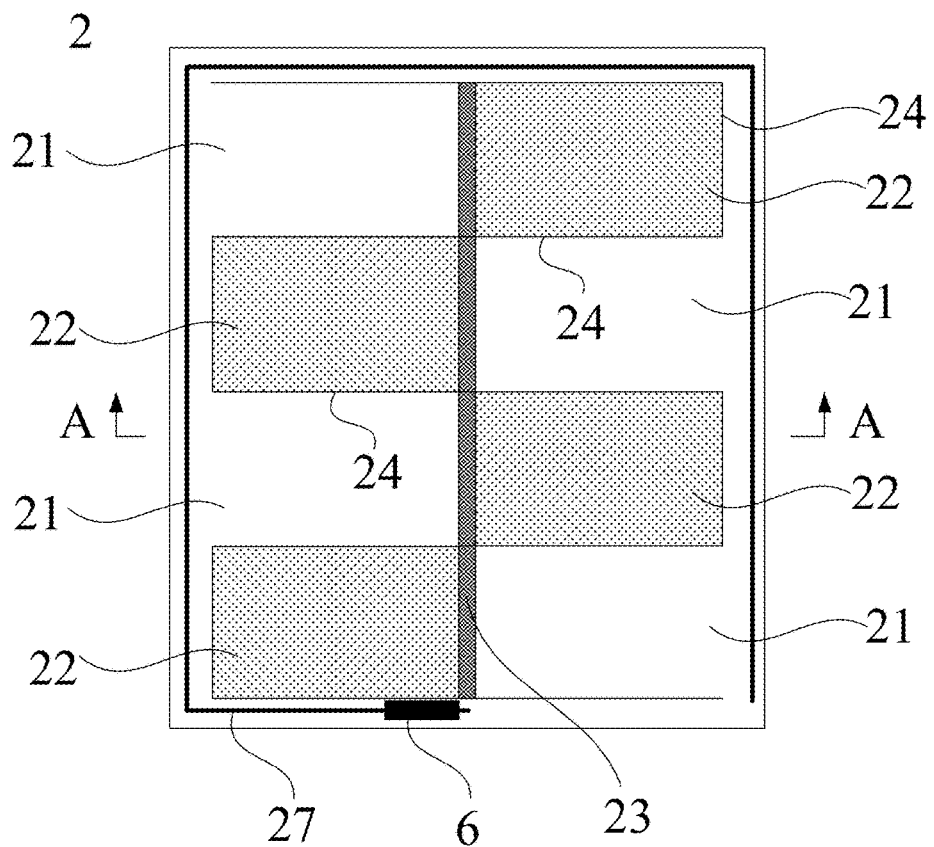
FIG. 3 is a structure diagram of a first transparent conductive layer of an electrochromic device according to embodiment two of the present application.
Figure 4:
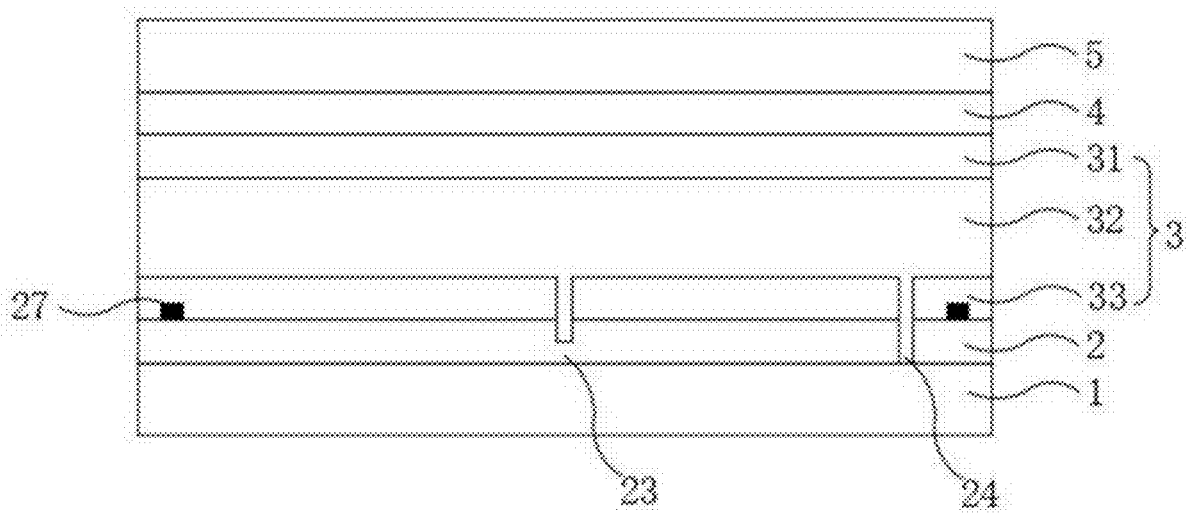
FIG. 4 is a sectional view of the electrochromic device in FIG. 3 taken along A-A.

The present embodiment provides an electrochromic device with a structure shown in FIGS. 3 and 4. The structure differs from that of embodiment one in that the first conductive layer 2 has four first regions 21 and four second regions 22.

As shown in FIG. 3, the first conductive layer 2 has four conductive channels 23. A width of a single conductive channel 23 is one side length corresponding to a single second region 22. For example, a width of a conductive channel 23 corresponding to a single second region 22 in an upper right corner of FIG. 3 is equal to a left side length of the second region 22 and 20% of a perimeter of the second region 22.

The first conductive layer 2 further includes a busbar 27 disposed on a periphery of the first conductive layer 2. In FIG. 3, the periphery is located in a region between the first and second regions and an edge of the conductive layer.

The lead-out electrode 6 is disposed on the busbar 27, and the first groove 24 is not in contact with the busbar 27.

In FIG. 3, all thin solid lines inside an outer edge represent the first groove 24.

In the present embodiment, the first groove 24 is formed after forming the coat of the ion storage layer 33, so as to ensure the consistency of the surface energy of the conductive layer and to ensure a coating effect of the ion storage layer 33 more easily.

In the present embodiment, the busbar 27 is disposed so that a difference between color change speeds of different first regions is reduced and a difference between color change speeds of different second regions is reduced.

In the present embodiment, a thickness of a conductive layer at the conductive channel 23 is reduced through laser etching so that a sheet resistance of the conductive layer at the conductive channel 23 is greater than a sheet resistance of a conductive layer in the first region 21, and moreover, the width of the conductive channel 23 is controlled to be 20% of the perimeter of the second region 22 so that a minimum conduction line resistance between a point in an interior of the second region 22 and the lead-out electrode is increased, a color change speed is slowed down and the color change speed of the second region 22 is less than a color change speed of the first region 21, thereby displaying a pattern with a specific rule in a color change process. Moreover, only one lead-out electrode 6 is needed to lead to the first conductive layer 2, which has the advantages of simple structure and process and low cost.

Embodiment Three

Figure 5:
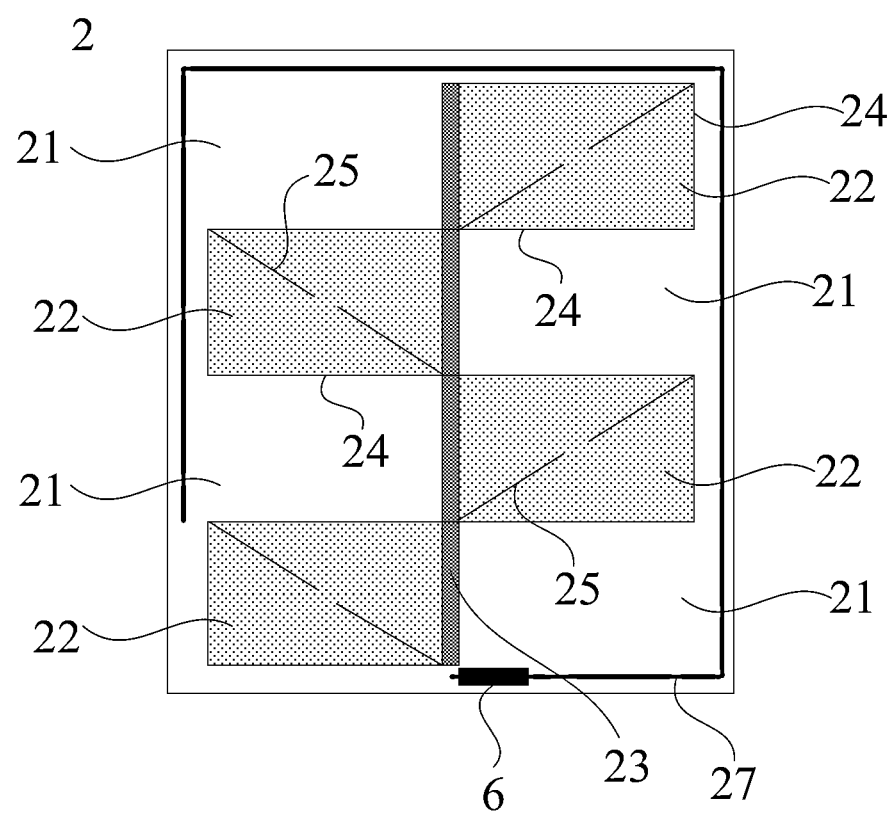
FIG. 5 is a structure diagram of a first transparent conductive layer of an electrochromic device according to embodiment three of the present application.

The present embodiment provides an electrochromic device with a structure shown in FIG. 5. The structure differs from that of embodiment two in that an interior of each second region 22 further includes one second groove 25.

Each second groove 25 divides an interior of a respective one second region 22 into two portions, and two portions of an interior of the same second region 22 are electrically connected to each other.

In FIG. 5, thin solid lines in an interior of a shadow region are second grooves 25, and other thin solid lines inside an outer edge except the second grooves 25 are first grooves 24.

In the present embodiment, on the basis of embodiment two, the second groove 25 is disposed in the second region 22 to divide the interior of the second region 22 into two portions (a portion of the second region 22 closer to the conductive channel 23 and a portion of the second region 22 away from the conductive channel 23) so that a shortest conduction path of a point on the portion away from the conductive channel 23 is increased ("a shortest conduction path of a point" refers to a shortest conduction path between the point and the lead-out electrode) and a color change speed of the portion away from the conductive channel 23 is reduced, thereby increasing the diversity of patterns displayed in a color change process.

Embodiment Four

Figure 6:
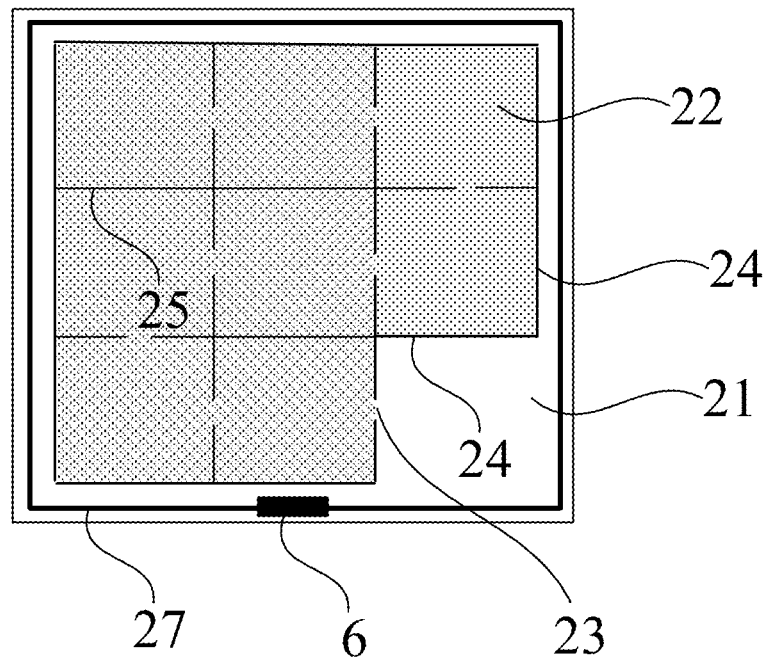
FIG. 6 is a structure diagram of a first transparent conductive layer of an electrochromic device according to embodiment four of the present application.

The present embodiment provides an electrochromic device with a structure shown in FIG. 6. The structure differs from that of embodiment one in that the width of the conductive channel 23 is 0.1% of the perimeter of the second region 22.

An interior of the second region 22 further includes eleven second grooves 25.

In FIG. 6, thin solid lines in an interior of a shadow region are second grooves 25, and other thin solid lines in the first conductive layer 2 except the second grooves 25 are first grooves 24.

The second grooves 25 divide the interior of the second region 22 into eight portions, and multiple portions of the interior of the second region 22 are electrically connected to each other.

The first conductive layer 2 further includes a busbar 27 disposed on a periphery of the first conductive layer 2.

The lead-out electrode 6 is disposed on the busbar 27, and the first groove 24 is not in contact with the busbar 27.

In the present embodiment, on the basis of embodiment one, the second groove 25 is disposed in the second region 22 to divide the interior of the second region 22 into eight portions, and multiple portions are electrically connected to each other through the channels at broken positions of the second grooves 25, so that lengths of shortest conduction paths between points on different portions and the lead-out electrode 6 are different, thereby increasing the diversity of patterns displayed in a color change process. Moreover, the busbar 27 is disposed to reduce a voltage drop of the periphery of the conductive layer, thereby increasing a color change speed.

Embodiment Five

Figure 7:
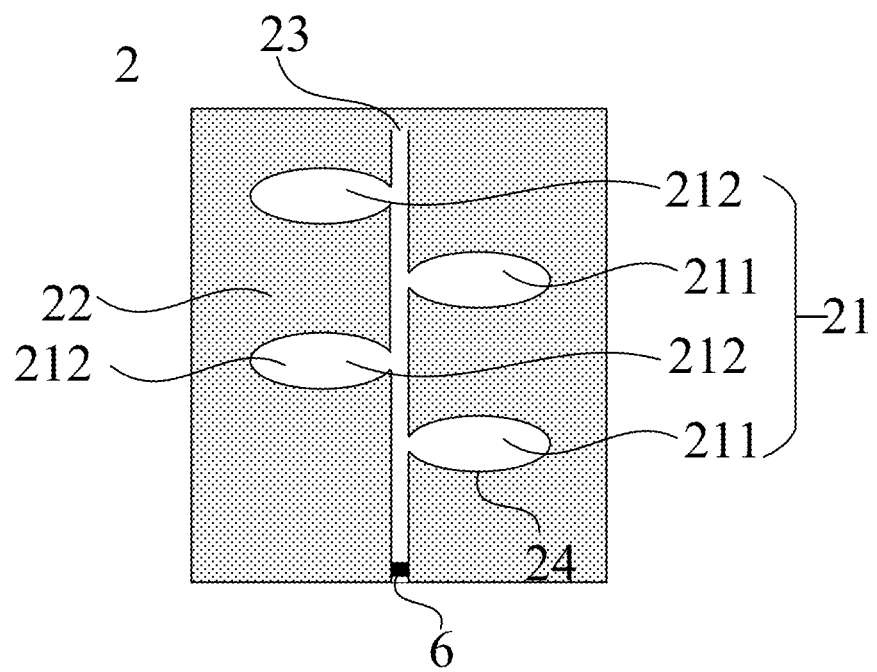
FIG. 7 is a structure diagram of a first transparent conductive layer of an electrochromic device according to embodiment five of the present application.

The present embodiment provides an electrochromic device with a structure shown in FIG. 7. The structure differs from that of embodiment one in that the first region 21 and the second region 22 are different in shape from that of embodiment one and the width of the conductive channel 23 is 0.01% of the perimeter of the second region 22. As shown in FIG. 7, a number value of the width of the conductive channel 23 is equal to a width of a narrow side corresponding to a stripe located in the middle.

In FIG. 7, all thin solid lines in the first conductive layer are the first groove 24.

Lithium perchlorate with a mass percentage of 20 wt %, methyl methacrylate with a mass percentage of 59.9 wt %, 20% propylene carbonate and azobisisobutyronitrile with a mass percentage of 0.1 wt % are mixed, and the mixture is coated on the ion storage layer and subjected to ultraviolet curing so that the solid electrolyte layer is formed.

Before the electrolyte layer of the electrochromic device is subjected to ultraviolet curing, an outside of the electrochromic device corresponding to the second region 22 is covered by a surface-coated polyethylene terephthalate (PET) thin film with an ultraviolet transmittance of 10%, an outside of the electrochromic device corresponding to a first portion 211 of the first region 21 is covered by a surface-coated PET thin film with an ultraviolet transmittance of 50%, and an outside of the electrochromic device corresponding to a second portion 212 of the first region 21 is not covered by a thin film.

Therefore, an extent of cross-linking of an electrolyte material within a projection region of the second region 22 on the solid electrolyte layer 32<an extent of cross-linking of an electrolyte material within a projection region of the first portion 211 of the first region 21 on the solid electrolyte layer 32<an extent of cross-linking of an electrolyte material within a projection region of the second portion 212 of the first region 21 on the solid electrolyte layer 32.

In the present embodiment, on the basis of embodiment one, the extents of cross-linking of different regions on the solid electrolyte layer 32 are controlled so that color change speeds of the different regions are inconsistent, thereby increasing the diversity of patterns displayed in a color change process.

Embodiment Six

Figure 8:
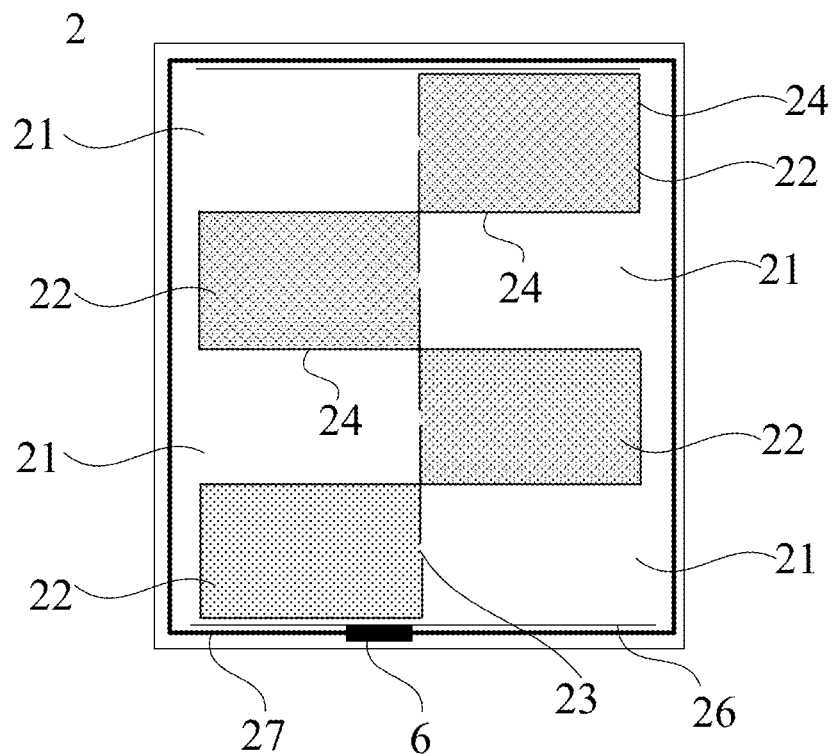
FIG. 8 is a structure diagram of a first transparent conductive layer of an electrochromic device according to embodiment six of the present application.

The present embodiment provides an electrochromic device with a structure shown in FIG. 8. The structure differs from that of embodiment two in that the width of the conductive channel 23 is 5% of the perimeter of the second region 22.

The sheet resistance of the conductive layer at the conductive channel 23 is equal to the sheet resistance of the conductive layer in the first region 21.

The first conductive layer 2 further includes a third groove 26 extending through the first conductive layer 2 in the vertical direction, being located on a side of a portion of the busbar 27 away from an edge of the first conductive layer 2, being not in contact with the first groove 24 and being not in contact with the busbar 27.

In the present embodiment, if the third groove 26 is not disposed, a current on the busbar 27 will be directly transferred to upper and left sides of a first region located in an upper left corner in FIG. 8, that is, the first region located in the upper left corner in FIG. 8 will exhibit an effect that the color changes from the upper and left sides to lower and right sides, and similarly, a first region located in a lower right corner will exhibit an effect that the color changes from the lower and right sides to the upper and left sides.

After the third groove 26 is disposed, the current on the busbar 27 can only be transferred to the first region 21 through busbars on left and right sides in FIG. 8, that is, the four first regions all exhibit an effect that the color changes from an outside to an inside.

In FIG. 8, thin solid lines of a perimeter of a shadow region are first grooves 24, and other thin solid lines in the first conductive layer 2 except the first grooves 24 are third grooves 26.

In the present embodiment, on the basis of embodiment two, the third groove 26 is disposed so that in the case where a position of the lead-out electrode 6 is not changed, a position where the current on the busbar 27 starts to be conducted to the first region 21 is changed from the original entire busbar region to the busbars on the left and right sides, thereby increasing the diversity of patterns displayed in a color change process.

Embodiment Seven

Figure 9:
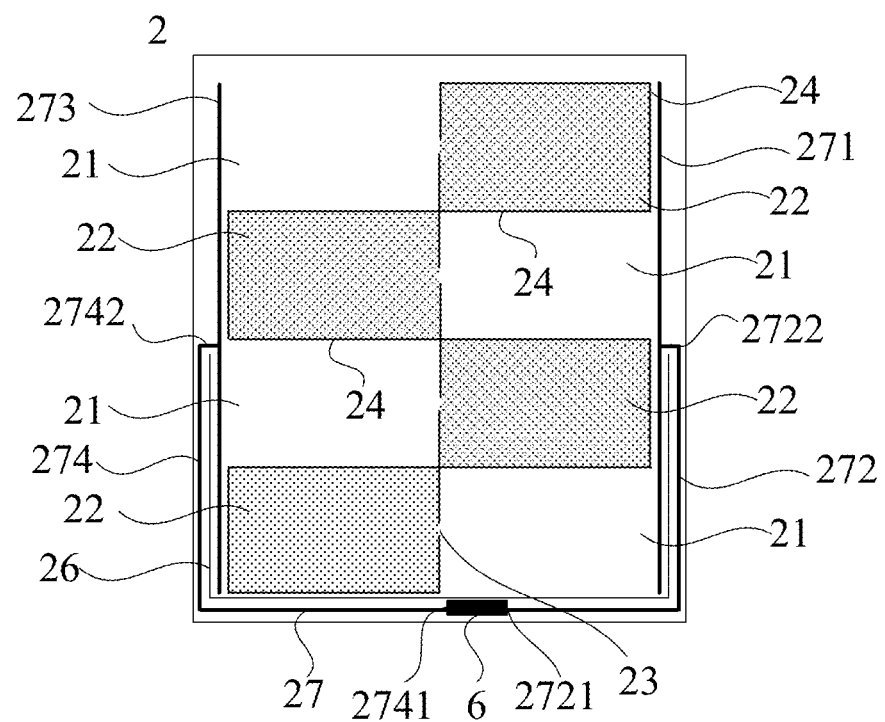
FIG. 9 is a structure diagram of a first transparent conductive layer of an electrochromic device according to embodiment seven of the present application.

The present embodiment provides an electrochromic device with a structure shown in FIG. 9. The structure differs from that of embodiment six in that the busbar includes a first busbar main portion 271, a first busbar connection portion 272, a second busbar main portion 273 and a second busbar connection portion 274.

A first endpoint 2721 of the first busbar connection portion is connected to the lead-out electrode 6, and a second endpoint 2722 of the first busbar connection portion is connected to a midpoint of the first busbar main portion 271.

A first endpoint 2741 of the second busbar connection portion is connected to the lead-out electrode 6, and a second endpoint 2742 of the second busbar connection portion is connected to a midpoint of the second busbar main portion 273.

Referring to FIG. 9, one portion of the third groove 26 is located between the first busbar main portion 271 and the first busbar connection portion 272, another portion of the third groove 26 is located between the second busbar main portion 273 and the second busbar connection portion 274, and another portion of the third groove 26 (a horizontal portion in FIG. 9) is located on a side of the busbar 27 away from the edge of the first conductive layer 2.

In FIG. 9, thin solid lines of a perimeter of a shadow region are first grooves 24, and other thin solid lines in the first conductive layer 2 except the first grooves 24 are third grooves 26.

In embodiment six, when lengths of busbars on left and right sides are too large and a voltage applied to the busbar 27 reaches an end away from the lead-out electrode 6 due to an effect of line resistance of the busbar 27, there will be a certain voltage loss so that color change speeds of two ends closer to and away from the lead-out electrode 6 are inconsistent.

In the present embodiment, on the basis of embodiment six, the busbar is disposed as multiple busbar main portions and multiple busbar connection portions so that in the case where a position of the lead-out electrode 6 is not changed, a position where a current on the lead-out electrode 6 starts to be conducted to the busbar 27 is changed into positions of intersection points of the busbar connection portions and the busbar main portions after adjustment, that is, the points 2722 and 2742, thereby reducing the inconsistency of the color change speeds of the two ends closer to and away from the lead-out electrode 6 and increasing the diversity of patterns displayed in a color change process.

The present application provides an electrochromic device. The electrochromic device includes a lead-out electrode and a first base layer, a first conductive layer, an electrochromic layer, a second conductive layer and a second base layer which are stacked in sequence. The first conductive layer has at least one first region and at least one second region. The first region is electrically connected to the lead-out electrode. A first groove is disposed between the first region and the second region and extends through the first conductive layer in a vertical direction. A conductive channel is further disposed between the first region and the second region, and the first groove is broken at the conductive channel. The second region is electrically connected to the first region and the lead-out electrode through the conductive channel.

Since the color changing of any point on the electrochromic device is directly related to a potential difference (an effective voltage) between the conductive layers corresponding to the point and the effective voltage of any point is related to a voltage drop between the point and the lead-out electrode in the case where a voltage applied externally to the lead-out electrode of the electrochromic device is the same, the smaller the voltage drop, the larger the effective voltage of the point, and the faster the color change speed. The voltage drop of any point is dependent on a minimum conduction line resistance between the point and the lead-out electrode (there are multiple conduction paths between the point and the lead-out electrode, where each path corresponds to one line resistance value, a minimum value of the line resistance value is the minimum conduction line resistance, a number value of the minimum conduction line resistance is related to a length of the conduction path and a line resistance value of each point on the conduction path, and the line resistance value of the each point on the conduction path is related to a sheet resistance of the conductive layer at the point and a width of the conduction path).

In the related art, generally, voltage drops of multiple points on the electrochromic device are continuously and gradually varied at the time of color changing, and when it is desirable that the electrochromic device does not achieve uniform color changing as a whole, but rather to be able to present a pattern in a color change process, there needs to be a relatively large difference between color change speeds of the second region and the first region with the first groove as a dividing line, that is, there is a relatively large difference value between a voltage drop of the first region and a voltage drop of the second region. Therefore, disposing the first groove to separate the second region from the first region and disposing a notch on the first groove to form the conductive channel to change a minimum conduction line resistance between each point of the second region and the lead-out electrode finally enables the voltage drop of the second region to be apparently greater than the voltage drop of the first region so that the first region and the second region are subjected to color changing at different color change speeds in the color change process, thereby achieving an effect of presenting the pattern.

Moreover, multiple portions of the entire electrochromic device are all electrically connected to each other due to the existence of the conductive channel. Therefore, a new lead-out electrode does not need to be disposed, and after color changing is completed, transmittances of the second region and the first region will gradually tend to be consistent so that the entire device will exhibit a visual effect of uniform and consistent transmittances.

In the present application, the pattern can be presented in the color change process, and the simplicity of the structure of the device is ensured while information is displayed or a sense of appearance design is enhanced, thereby reducing a process difficulty and a production cost.

For example, a sheet resistance of the conductive channel is greater than a sheet resistance of the first region.

A current generated by a voltage applied by an external circuit at the lead-out electrode is conducted through the first region to the conductive channel and then to the second region, that is, minimum conduction paths between all points in an interior of the second region and the lead-out electrode necessarily include the conductive channel. Therefore, the sheet resistance at the conductive channel is increased to be greater than the sheet resistance of the first region so that minimum conduction line resistances between all the points in the interior of the second region and the lead-out electrode can be increased, thereby increasing the voltage drop, further enabling the color change speed of the second region to be less than the color change speed of the first region and achieving the effect of displaying the pattern.

For example, the sheet resistance at the conductive channel may be increased through manners such as thinning a thickness of the conductive layer at the conductive channel through laser etching.

For example, a width of the conductive channel is less than or equal to 20% of a perimeter of the second region, for example, 20%, 15%, 10%, 5%, 3%, 1%, 0.5%, 0.1% or 0.05%, and so on. Here, the width of the conductive channel refers to a distance between two endpoints of the first groove at a boundary of the conductive channel.

Adjusting the width of the conductive channel can change lengths of shortest conduction paths between certain points in the interior of the second region and the lead-out electrode. Since the longer the length of the conduction path and the larger the minimum conduction line resistance between the point and the lead-out electrode when other conditions are consistent, the larger the voltage drop, and the slower the color change speed. Moreover, since the conduction paths of all the points in the interior of the second region necessarily pass through the conductive channel, adjusting the width of the conductive channel also makes a line resistance value at the conductive channel and the line resistance values of the conduction paths of all the points in the interior of the second region adjusted. Therefore, limiting the width of the conductive channel makes a minimum conductive line resistance between a point in the interior of the second region and the lead-out electrode increase so that the color change speed of the second region can be less than the color change speed of the first region, thereby achieving the effect of displaying the pattern.

For example, at least one second groove is disposed in the interior of the second region and extends through the first conductive layer in the vertical direction.

The second groove divides the interior of the second region into at least two portions, and the at least two portions of the interior of the second region are electrically connected to each other.

The second groove is disposed in the second region to divide the interior of the second region into at least two portions so that lengths of shortest conduction paths between points on some regions of the interior of the second region and the lead-out electrode are increased and color change speeds of the regions are reduced, thereby increasing the diversity of patterns displayed in the color change process.

For example, a width of the first groove and a width of the second groove are both less than or equal to 0.1 mm, for example, 0.1 mm, 0.08 mm, 0.06 mm, 0.04 mm, 0.02 mm, 0.01 mm, 50 μm, 10 μm, 5 μm or 1 μm, and so on. For example, the width of the first groove and the width of the second groove are both less than or equal to 0.02 mm, respectively.

The smaller the width of the groove, the more invisible the groove is to human eyes, and the higher the visual integrity of the electrochromic device.

For example, the first conductive layer further includes a busbar disposed on a periphery of the first conductive layer, where the lead-out electrode is disposed on the busbar, and the first groove is not in contact with the busbar.

The disposition of the busbar can reduce a voltage drop of the conductive layer to increase the color change speed. Further, when the number of first regions and second regions is relatively large, color change speeds of a first region relatively far from the lead-out electrode and a first region relatively close to the lead-out electrode may be inconsistent due to different voltage drops of the conductive layer which is unacceptable in some application scenarios. Therefore, the difference in voltage drop in the same region brought by the conductive layer can be reduced through the disposition of the busbar.

For example, the difference in voltage drop can also be reduced through the adjustment of the width of the periphery.

For example, the first conductive layer further includes a third groove extending through the first conductive layer in the vertical direction, being located on a side of at least a portion of the busbar away from an edge of the first conductive layer, being not in contact with the first groove and being not in contact with the busbar.

Two lead-out electrodes are generally located on the same side of the electrochromic device to facilitate the connection to an external control structure. In this case, a color changing effect of the electrochromic device is generally represented as follows: a region near the lead-out electrode first achieves color changing, and then color changing gradually diffuses to the other end away from the lead-out electrode, and other color changing effects cannot be achieved, for example, one end closer to the lead-out electrode and the other end away from the lead-out electrode first achieve color changing simultaneously, and then color changing gradually diffuses to a region between the two ends.

Since the third groove is located on the side of at least a portion of the busbar away from the edge of the first conductive layer, the third groove can block direct conduction of a current on a busbar segment adjacent to the third groove to a first region adjacent to the third groove, that is, the third groove is disposed so that in the case where a position of the lead-out electrode is not changed, an initial position where the current on the busbar is conducted to the first region is changed, thereby increasing the diversity of the patterns displayed in the color change process.

For example, the busbar includes at least one busbar main portion and at least one busbar connection portion, where a first endpoint of the busbar connection portion is connected to the lead-out electrode, and a second endpoint of the busbar connection portion is connected to the busbar main portion and does not coincide with an endpoint of the busbar main portion closer to the lead-out electrode.

The third groove is at least partially located between the busbar main portion and the busbar connection portion.

When a length of the busbar is too large, for a voltage applied to the busbar reaching the end away from the lead-out electrode, there will be a very large voltage loss due to an effect of line resistance of the busbar so that color change speeds of the two ends closer to and away from the lead-out electrode are inconsistent.

The busbar is disposed as the busbar main portion and the busbar connection portion so that in the case where the position of the lead-out electrode is not changed, a position of an intersection point of the busbar connection portion and the busbar main portion is adjusted and an initial position where a current on the lead-out electrode is conducted to the busbar main portion is adjusted, thereby reducing the inconsistency of the color change speeds of the two ends closer to and away from the lead-out electrode and increasing the diversity of the patterns displayed in the color change process.

For example, the second endpoint of the busbar connection portion coincides with a midpoint of the busbar main portion.

For example, the electrochromic layer includes a color-changing material layer, a solid electrolyte layer and an ion storage layer which are stacked in sequence.

For example, the ion storage layer is in contact with the first conductive layer.

In the present application, that the groove extends through the first conductive layer in the vertical direction means that there is no first conductive layer material at the groove, and the groove may be a slot extending through the first conductive layer, may be filled with an electrochromic layer material (such as a color-changing material layer material, an ion storage layer material or an electrolyte layer material), or may be filled with other transparent insulating materials (such as a transparent polyacrylate adhesive).

It is to be noted that the "groove" according to the present application may be predisposed on the first conductive layer, may be formed through a manner such as laser or mechanical etching on a side of the color-changing material layer (or the ion storage layer) away from the first conductive layer after the color-changing material layer (or the ion storage layer) is formed on the first conductive layer, or may be formed through the manner such as laser or mechanical etching on a side of the first base layer away from the first conductive layer after the electrochromic device is formed.

When the groove is formed through the manner such as laser etching on the side of the color-changing material layer (or the ion storage layer) away from the first conductive layer after the color-changing material layer (or the ion storage layer) is formed on the first conductive layer, a color-changing material layer material (or an ion storage layer material) of a projection region of the groove on the color-changing material layer (or the ion storage layer) is removed by laser. Since the color-changing material layer is colored, once the corresponding color-changing material layer material at the groove is removed, the groove will be visually apparent, while a color of the ion storage layer material is relatively not so apparent, and thus the ion storage layer is selected to be in contact with a first conductive substrate in an embodiment of the present application.

In the present application, the electrochromic device is prepared through a preparation method in the related art, for example, prepared through the preparation method below.

(1) The conductive layer is formed on the base: the conductive layer is formed on the base through a magnetron sputtering method (or vacuum vapor deposition, sol-gel process and chemical vapor deposition).

(2) The groove is formed on the first conductive layer: the first groove is formed on the first conductive layer through laser etching.

(3) The color-changing material layer is coated on the second conductive layer: 500 mg of poly(3-hexylthiophene) (P3HT) is dissolved in 10 mL of o-xylene and magnetically stirred for 10 h, and then the obtained solution is dropped onto an indium tin oxide (ITO) layer (the second conductive layer) coated on the second base and spin-coated to form the color-changing material layer.

(4) The ion storage layer is coated on the first conductive layer: 500 mg of tungsten trioxide is dissolved in 20 mL of deionized water, stirred and filtered, and the obtained solution is dropped onto an ITO layer (the first conductive layer) coated on the first base and spin-coated to form a tungsten trioxide coating to obtain the ion storage layer.

(5) The entire electrochromic device is prepared: lithium perchlorate with a mass percentage of 20 wt %, methyl methacrylate with a mass percentage of 59.9 wt %, 20% propylene carbonate and azobisisobutyronitrile with a mass percentage of 0.1 wt % are mixed and the ion storage layer is coated with the mixture so that an electrolyte coat is formed, and then the above color-changing material layer (together with the second base layer) is covered on the electrolyte coat and subjected to ultraviolet curing to make the electrolyte coat form the solid electrolyte layer.

For example, before step (2), the following step may be further included: the busbar is formed on the first conductive layer: the busbar is formed on the periphery of the first conductive layer through screen printing.

For example, an electrolyte material within a projection region of at least a portion of the first region on the solid electrolyte layer and an electrolyte material within a projection region of at least a portion of the second region on the solid electrolyte layer have different extents of cross-linking.

For example, a material of the solid electrolyte layer is in a liquid state or a gel state before being solidified, and an extent of cross-linking of the material of the solid electrolyte layer can be increased through a method such as ultraviolet irradiation or heating so that a liquid or gel electrolyte is solidified to form the solid electrolyte layer. For example, the material of the electrolyte layer may include lithium perchlorate, methyl methacrylate, propylene carbonate and azobisisobutyronitrile. It is to be understood that the example materials provided above do not limit the solid electrolyte material of the present application and all solid electrolyte materials that can meet the foregoing performance description in the related art or developed in the future may be applicable.

In the present application, there is no particular limitation on a method for achieving different extents of cross-linking of electrolyte materials of different regions. For example, an ultraviolet blocking method can be used, that is, different regions are blocked by substances having different ultraviolet transmittances before the electrolyte layer is subjected to ultraviolet curing so that electrolyte materials of the different regions have different extents of cross-linking.

The higher the extent of cross-linking of the electrolyte layer material, the slower the migration speed of ions, and the slower the color change speed. Therefore, when the electrolyte material within the projection region of at least a portion of the first region on the solid electrolyte layer and the electrolyte material within the projection region of at least a portion of the second region on the solid electrolyte layer have different extents of cross-linking, the projection region of at least a portion of the first region on the solid electrolyte layer and the projection region of at least a portion of the second region on the solid electrolyte layer also have different color change speeds, thereby increasing the diversity of the patterns displayed in the color change process.

For example, an extent of cross-linking of the electrolyte material within the projection region of at least a portion of the first region on the solid electrolyte layer is less than an extent of cross-linking of the electrolyte material within the projection region of at least a portion of the second region on the solid electrolyte layer.

Since in most cases, it is desirable that the color change speed of the second region is less than the color change speed of the first region, when the extent of cross-linking of the electrolyte material within the projection region of at least a portion of the first region on the solid electrolyte layer is less than the extent of cross-linking of the electrolyte material within the projection region of at least a portion of the second region on the solid electrolyte layer, this visual effect can be enhanced (that is, the color change speed of the second region is less than the color change speed of the first region).

In a second aspect, the present application provides an electronic terminal. The electronic terminal includes the electrochromic device according to the first aspect.

For example, the color-changing material layer is located on a side closer to a line of sight of human eyes.

Since the electrochromic device has a multilayer structure, when the color-changing material layer is located on the side closer to the line of sight of the human eyes, a color of the device perceived by the human eyes will be brighter with a better visual effect.

In the present application, disposing the first groove to separate the first region from the second region and disposing the notch on the first groove to form the conductive channel to change the minimum conduction line resistance between each point of the second region and the lead-out electrode finally enables the voltage drop of the second region to be apparently greater than the voltage drop of the first region so that the first region and the second region are subjected to color changing at different color change speeds in the color change process, thereby achieving the effect of presenting the pattern. Moreover, multiple portions of the entire electrochromic device are all electrically connected to each other due to the existence of the conductive channel. Therefore, a new lead-out electrode does not need to be disposed, and after color changing is completed, the entire device will exhibit the visual effect of uniform and consistent transmittances. In the present application, the pattern can be presented in the color change process, and the simplicity of the structure of the device is ensured while an effect of displaying the information or enhancing the sense of appearance design is achieved, thereby reducing the process difficulty and the production cost.

According to the electrochromic device of the present application, the pattern can be displayed in the color change process to achieve the effect of displaying the information or enhancing the sense of appearance design, and a new lead-out electrode does not need to be disposed so that the structure of the device is simple and the process difficulty and the production cost are reduced.

What is claimed is:

1. An electrochromic device, comprising: a lead-out electrode and a first base layer, a first conductive layer, an electrochromic layer, a second conductive layer and a second base layer which are stacked in sequence; wherein
    the first conductive layer has at least one first region and at least one second region;
    the first region is electrically connected to the lead-out electrode;
    a first groove is disposed between the first region and the second region and extends through the first conductive layer in a vertical direction;
    a conductive channel is further disposed between the first region and the second region, and the first groove is broken at the conductive channel; and
    the second region is electrically connected to the first region and the lead-out electrode through the conductive channel.

2. The electrochromic device according to claim 1, wherein a sheet resistance of the conductive channel is greater than a sheet resistance of the first region.

3. The electrochromic device according to claim 1, wherein a width of the conductive channel is less than or equal to 20% of a perimeter of the second region.

4. The electrochromic device according to claim 1, wherein at least one second groove is disposed in an interior of the second region and extends through the first conductive layer in the vertical direction; and
    the second groove divides the interior of the second region into at least two portions, and the at least two portions of the interior of the second region are electrically connected to each other.

5. The electrochromic device according to claim 4, wherein a width of the first groove and a width of the second groove are both less than or equal to 0.1 mm.

6. The electrochromic device according to claim 4, wherein a width of the first groove and a width of the second groove are both less than or equal to 0.02 mm.

7. The electrochromic device according to claim 4, wherein the second groove is a slot extending through the first conductive layer, is filled with an electrochromic layer material, or is filled with a transparent insulating material other than the electrochromic layer material.

8. The electrochromic device according to claim 1, wherein the first conductive layer further comprises a busbar disposed on a periphery of the first conductive layer, wherein the lead-out electrode is disposed on the busbar, and the first groove is not in contact with the busbar.

9. The electrochromic device according to claim 8, wherein the first conductive layer further comprises a third groove, wherein the third groove extends through the first conductive layer in the vertical direction, is located on a side of at least a portion of the busbar away from an edge of the first conductive layer, is not in contact with the first groove and is not in contact with the busbar.

10. The electrochromic device according to claim 9, wherein the third groove is a slot extending through the first conductive layer, is filled with an electrochromic layer material, or is filled with a transparent insulating material other than the electrochromic layer material.

11. The electrochromic device according to claim 9, wherein the busbar comprises at least one busbar main portion and at least one busbar connection portion, wherein a first endpoint of the busbar connection portion is connected to the lead-out electrode, and a second endpoint of the busbar connection portion is connected to the busbar main portion and does not coincide with an endpoint, which is closer to the lead-out electrode, of the busbar main portion; and at least part of the third groove is located between the busbar main portion and the busbar connection portion.

12. The electrochromic device according to claim 11, wherein the second endpoint of the busbar connection portion coincides with a midpoint of the busbar main portion.

13. The electrochromic device according to claim 1, wherein the electrochromic layer comprises a color-changing material layer, a solid electrolyte layer and an ion storage layer which are stacked in sequence.

14. The electrochromic device according to claim 13, wherein the ion storage layer is in contact with the first conductive layer.

15. The electrochromic device according to claim 13, wherein an electrolyte material within a projection region of at least a portion of the first region on the solid electrolyte layer and an electrolyte material within a projection region of at least a portion of the second region on the solid electrolyte layer have different extents of cross-linking.

16. The electrochromic device according to claim 15, wherein an extent of cross-linking of the electrolyte material within the projection region of at least a portion of the first region on the solid electrolyte layer is less than an extent of cross-linking of the electrolyte material within the projection region of at least a portion of the second region on the solid electrolyte layer.

17. The electrochromic device according to claim 1, wherein two lead-out electrodes are provided and located on a same side of the electrochromic device.

18. The electrochromic device according to claim 1, wherein the first groove is a slot extending through the first conductive layer, is filled with an electrochromic layer material, or is filled with a transparent insulating material other than the electrochromic layer material.

19. An electronic terminal, comprising the electrochromic device according to claim 1.

20. The electronic terminal according to claim 13, wherein the color-changing material layer is located on a side closer to a line of sight of human eyes.

* * * * *